United States Patent
Grauer et al.

(10) Patent No.: US 9,712,754 B2
(45) Date of Patent: Jul. 18, 2017

(54) METHOD AND SYSTEM FOR SELECTIVE IMAGING OF OBJECTS IN A SCENE TO YIELD ENHANCED IMAGE

(71) Applicant: BRIGHTWAY VISION LTD., Haifa (IL)

(72) Inventors: Yoav Grauer, Haifa (IL); Ofer David, Haifa (IL); Eyal Levi, Haifa (IL)

(73) Assignee: BRIGHTWAY VISION LTD., Haifa (IL)

( * ) Notice: Subject to any disclaimer, the term of this patent is extended or adjusted under 35 U.S.C. 154(b) by 0 days.

(21) Appl. No.: 14/902,013

(22) PCT Filed: Jun. 29, 2014

(86) PCT No.: PCT/IL2014/050580
§ 371 (c)(1),
(2) Date: Dec. 30, 2015

(87) PCT Pub. No.: WO2015/001550
PCT Pub. Date: Jan. 8, 2015

(65) Prior Publication Data
US 2016/0373633 A1    Dec. 22, 2016

(30) Foreign Application Priority Data
Jun. 30, 2013   (IL) .......................................... 227265

(51) Int. Cl.
*H04N 5/222*  (2006.01)
*H04N 5/235*  (2006.01)
(Continued)

(52) U.S. Cl.
CPC .......... *H04N 5/2352* (2013.01); *G01S 17/06* (2013.01); *G01S 17/08* (2013.01); *G03B 7/16* (2013.01);
(Continued)

(58) Field of Classification Search
CPC .. H04N 5/2351; H04N 5/2353; H04N 5/2354; H04N 5/353; H04N 5/2256;
(Continued)

(56) References Cited

U.S. PATENT DOCUMENTS 4,708,473 A    11/1987  Metzdorff et al.
6,057,909 A     5/2000  Yahav et al.
(Continued)

FOREIGN PATENT DOCUMENTS

IL    170098    4/2010
IL    177078    8/2012

OTHER PUBLICATIONS

International Search Report of PCT Application No. PCT/IL2014/050580, mailed Nov. 19, 2014.
(Continued)

*Primary Examiner* — Kelly L Jerabek
(74) *Attorney, Agent, or Firm* — Pearl Cohen Zedek Latzer Baratz LLP

(57) ABSTRACT

A system and a method for object selective camera flash are provided herein. The steps of the method may include: capturing a raw image of a scene using a capturing device, wherein a scene comprises background and objects viewed by the capturing device; indicating at least one location on the captured raw image, wherein the location on the captured image corresponds with a location in the scene; calculating a volume portion within the scene based on the indicated at least one location on the captured raw image; generating a flash pulse having specified parameters directed at the scene; synchronizing an exposure of the capturing device to be carried out when reflections of the flash pulse from the calculated volume portion reaches the capturing device; and accumulating the reflections to yield an enhanced image.

20 Claims, 10 Drawing Sheets

(51) Int. Cl.
*G01S 17/06* (2006.01)
*G03B 7/16* (2014.01)
*H04N 5/225* (2006.01)
*H04N 5/232* (2006.01)
*G01S 17/08* (2006.01)
*G03B 9/70* (2006.01)
*G01S 17/10* (2006.01)
*G01S 7/48* (2006.01)

(52) U.S. Cl.
CPC ......... *H04N 5/2256* (2013.01); *H04N 5/2354* (2013.01); *H04N 5/23216* (2013.01); *G01S 7/4802* (2013.01); *G01S 17/107* (2013.01); *G03B 9/70* (2013.01)

(58) Field of Classification Search
CPC .. G06K 9/2027; G03B 2215/05; G03B 15/02; G03B 15/04
USPC .................. 348/362, 366–367, 370–371
See application file for complete search history.

(56) References Cited

U.S. PATENT DOCUMENTS

| | | | |
|---|---|---|---|
| 6,876,392 | B1 | 4/2005 | Uomori et al. |
| 7,962,031 | B2 | 6/2011 | Tsai |
| 8,194,126 | B2 | 6/2012 | David et al. |
| 8,786,767 | B2* | 7/2014 | Rihn .................... H04N 5/2256 |
| | | | 348/207.1 |
| 2007/0221849 | A1 | 9/2007 | Tabirian et al. |
| 2010/0053592 | A1 | 3/2010 | Yahav et al. |
| 2013/0308045 | A1* | 11/2013 | Rhoads ................ H04N 5/2256 |
| | | | 348/371 |
| 2014/0247368 | A1* | 9/2014 | Chinn ................ H04N 5/23222 |
| | | | 348/207.1 |

OTHER PUBLICATIONS

Office action of IL Patent Application No. 227265, issued Dec. 23, 2013.
Supplementary European Search Report of EP Patent Application No. 14820070.2, mailed on Jan. 24, 2017.

* cited by examiner

METHOD AND SYSTEM FOR SELECTIVE IMAGING OF OBJECTS IN A SCENE TO YIELD ENHANCED IMAGE

CROSS-REFERENCE TO RELATED APPLICATIONS

This application is a National Phase Application of PCT International Application No. PCT/IL2014/050580, International Filing Date Jun. 29, 2014, entitled: "METHOD AND SYSTEM FOR SELECTIVE IMAGING OF OBJECTS IN A SCENE TO YIELD ENHANCED IMAGE", published on Jan. 5, 2015 as International Patent Application Publication No. WO 2015/001550, claiming priority of Israel Patent Application No. 227265, filed Jun. 30, 2013, which is incorporated herein by reference in its entirety.

FIELD OF THE INVENTION

The disclosed technique relates to illuminating and imaging system, in general, and to method of low light level enhancement for a camera device, in particular.

BACKGROUND OF THE INVENTION

In photography, a conventional camera flash (visible or non-visible spectrum) is used to improve image picture quality in low light situations, by illuminating the scene with a burst (single pulse or multiple pulses) while a picture is taken. Typical flash light source may include a Light Emitting Diode (LED) or may include gas discharge lamps or even may even include a LASER. Typical camera includes a CCD, CMOS or a hybrid sensor with single exposure duration per a sensor single frame read-out.

Prior art such as U.S. Pat. No. 7,962,031 B2, entitled "Pulsed control of camera flash" is directed to improve the ability to subsequently discriminate the high frequency or edge components of the picture, during the subsequent deblurring or motion compensation operation. The described technique does not provide any means for illuminating a selected volume of the captured scenery image.

Another prior art such as U.S. Pat. No. 8,194,126 B2, entitled "Gated imaging" is directed towards a gated camera imaging system and method, utilizing a laser device for generating a beam of long duration laser pulses toward a target. A camera receives the energy of the pulses reflected from the target. The camera gating is synchronized to be set 'OFF' for at least the duration of time it takes the laser device to produce a laser pulse in its substantial entirety, including an end of the laser pulse, in addition to the time it takes the laser pulse to complete traversing a zone proximate to the system and back to the camera. The camera gating is then set ON for an ON time duration thereafter, until the laser pulse reflects back from the target and is received in the camera. The laser pulse width substantially corresponds to at least the ON time duration.

Israeli patent application IL170098 discloses a gated camera imaging system and method, utilizing a laser device for generating a beam of long duration laser pulses toward a target. A camera receives the energy of light reflexes of the pulses reflected from the target. The camera gating is synchronized to be set OFF for at least the duration of time it takes the laser device to produce a laser pulse in its substantial entirety, including an end of the laser pulse, in addition to the time it takes the laser pulse to complete traversing a zone proximate to the system and back to the camera, and set ON for an ON time duration thereafter until the laser pulse reflects back from the target and is received in the camera. The laser pulse width substantially corresponds to at least the ON time duration. Preferably, the laser device includes a Diode Laser Array (DLA).

Israeli patent application IL177078 discloses an imaging system, including a transmission source providing pulse(s), and a gated sensor for receiving pulse reflections from objects located beyond a minimal range. The pulse and the gate timing are controlled for creating sensitivity as a function of range, such that the amount of the energy received progressively increases with the range. Also an imaging method, including emitting pulse(s) to a target area, receiving reflections of pulses reflected from objects located beyond a minimal range, the receiving includes gating detection of the reflections, and progressively increasing the received energy of the reflections, by controlling the pulses and the timing of the gating.

Prior art does not provide a selective and controllable scene volume imaging in low light level conditions nor does it address imaging enhancement in low-light level in harsh weather such as rain or snow versus the proposed method. In addition prior art does not provide any solution to provide a unified image enhancement in a certain range in low-light level conditions.

SUMMARY OF THE INVENTION

In accordance with the disclosed technique, there is thus provided a system having a camera device for taking a picture, where a control unit is to synchronize each camera pulse light flash to each camera exposure to yield a selective and controllable scene volume. As redefined here, the term "selective scene volume" is considered as an illuminated and accumulated portion of the viewed scene wherein a minimal range ($R_{min} \geq 0$ m) and wherein a maximal range ($R_{max}$) maybe applicable. As redefined here, the term "controllable scene volume" is considered as a specific selective scene volume is chosen by user and/or automatically by the control unit. In addition, a single image frame (i.e. still image or a video frame) may have several selective and controllable scene volumes (e.g. two scene volumes with different $R_{min}$ and different $R_{max}$ or two scene volumes with similar $R_{min}$ and different $R_{max}$ etc.).

The aforementioned user input may be carried out by selection of a specified volume such as a 3D box in the scene, selection of a specified range in the scene, and selecting one or more objects in the scene to be ignored and so not to apply the flash illumination at the ignored objects.

Implementing a minimal range ($R_{min} \geq 0$ m) accumulating in the camera provides a mean of providing an enhanced picture under low illumination with harsh weather conditions (e.g. rain, snow and fog) or in different spatial locations.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIG. 3A-FIG. 3E illustrate different selective and controllable scene volume in accordance with some embodiments of the present invention;

DETAILED DESCRIPTION OF THE INVENTION

Figure 1:
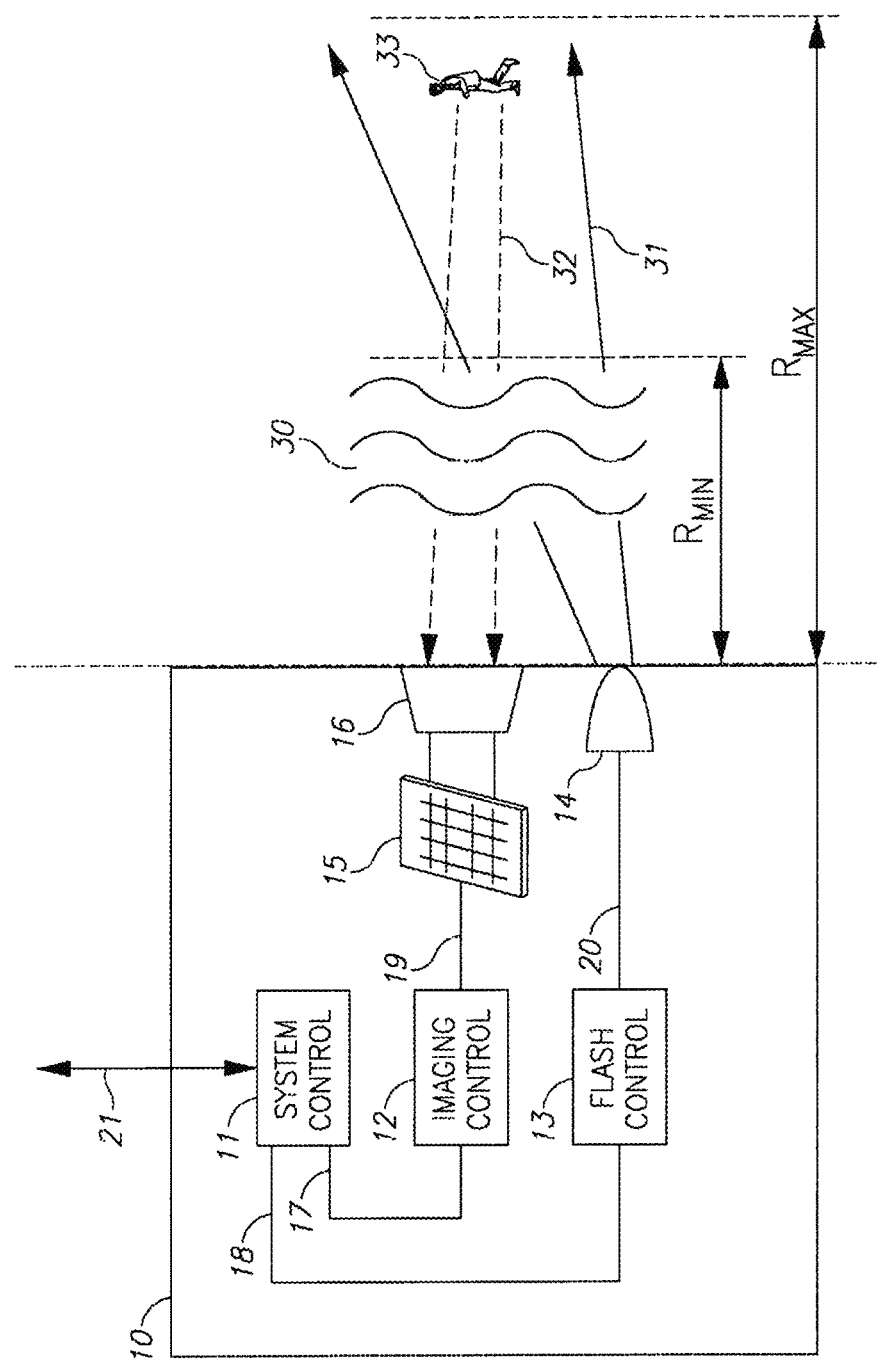
FIG. 1 is a schematic illustration of the operation of a system, constructed and operative in accordance with some embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In accordance with the present invention, the disclosed technique provides methods and systems for accumulating a selective and controllable scene volume, using electro-optical techniques based on the principle of sensor and active illumination synchronization. Accordingly, the terms "target" or "object" refer to any object in general, "camera pulse light flash" refers to any suitable source emitting of electromagnetic energy radiation (i.e. photons in any known wavelength) and "sensor" refers to any apparatus collecting of electromagnetic energy radiation (i.e. photons in any known wavelength) in the camera to provide a signal (e.g. pixel, 1D pixel array, 2D pixel array etc.). The "sensor" maybe based on; CMOS Imager Sensor, CCD, SPAD, Photo-diode, Hybrid FPA, Photomultiplier (including Image Intensifier) etc.

Accordingly, the disclosed technique provides for manipulation of signal capturing in a camera device, as a function of the accumulated depth-of-field, by changing the flash illumination parameters, by changing the sensor parameters. According to one embodiment, the system is part of a portable, for example, a mobile-phone, a tablet, a laptop or any other digital camera device. The disclosed technique is not limited to the embodiment of a portable and/or handheld platform.

A gated imaging system known in the art is described in U.S. Pat. No. 8,194,126 B2, titled "Gated imaging". Light source pulse (in free space) is defined as:

$$T_{LASER} = 2 \times \left(\frac{R_0 - R_{min}}{c}\right),$$

where the parameters defined in index below. Gated camera ON time (in free space) is defined as:

$$T_{ON} = 2 \times \left(\frac{R_{max} - R_{min}}{c}\right).$$

Gated camera OFF time (in free space) is defined as:

$$T_{OFF} = 2 \times \frac{R_{min}}{c},$$

where c is the speed of light, $R_0$, $R_{min}$ and $R_{max}$ are specific ranges. The gated imaging utilized to create an image sensitivity as a function of range through time synchronization of $T_{LASER}$, $T_{ON}$ and $T_{OFF}$.

The term "raw image" as described herein may include still images, video frames but also a gated image which is the product of a gated imaging device in which one or more slices were fused together.

Reference is now made to FIG. 1, which is a schematic illustration of the operation of a system, generally referenced 10, constructed and operative in accordance with an embodiment of the disclosed technique.

System 10 includes a flash module 14, an imaging sensor 15 and control units (11, 12 and 13). Flash module 14 generates a light beam 31 in the form of pulsed (single/series of continues pulses). Flash module 14 emits light beam 31 toward the scenery. Light beam 31 illuminates a potential target 33 in the scenery. Imaging sensor 15 receives reflected light source beam 32 from target 33. Imaging sensor 15 and flash module 14 are synchronized to each other as related to $T_{LASER}$, $T_{ON}$ and $T_{OFF}$ by system control 11.

Atmospheric conditions, such as aerosols, humidity, haze, fog, smog, smoke, rain, snow and the like, represented by zone 30, may exist in the surrounding area of system 10. Backscatter from the area in the immediate proximity to system 10 has a more significant influence on imaging sensor 15 than backscatter from further distanced area. Approximate range designated as $R_{min}$ defines the area proximate to system 10 from which the avoidance of backscattered light emitted by flash module 14. The potential target 33 is not expected to be located within range $R_{min}$, therefore the removal of the influences of atmospheric conditions 30 in this range from the captured signal in the imaging sensor unit 15. These atmospheric conditions interfere with light beam 31 on its way to illuminate target 33, and with light beam 32 reflected from target 33. For a specific volume of the scenery, imaging sensor 15 does not accumulate light beam 31 for the duration of time that light beam 31 has completely propagated a distance $R_{min}$ toward target 33 in the specific volume of the scenery, including the return path to imaging sensor 15 from distance $R_{min}$ the specific volume of the scenery. Distance between system 10 and potential target 33 is designated range $R_{max}$ (i.e. potential target 33 can be located anywhere between ranges $R_{min}$ and $R_{max}$). This technique utilizes the low reflected signal background versus the high reflected signal originating from a potential target 33. In indoor system 10 usages, atmospheric conditions 30 is usually negligible whereas to outdoor system 10 usages may significantly deviate.

Imaging sensor 15 is adapted to be synchronized to light signal (photons) and maybe adapted to accumulate photo-electrical signal prior sensor signal readout. Imaging optical module 16 maybe adapted for filtering certain wavelength spectrums, as may be performed by a band pass filter and/or adapted to filter various light polarizations. Imaging optical module 16 is adapted to operate and detect electromagnetic wavelengths similar to those provided by imaging sensor 15. Imaging optical module 16 is further adapted for focusing incoming light onto light sensitive area of imaging sensor 15 and providing its required Field-of-View.

Flash module 14 is adapted to provide electromagnetic wavelengths which are detectable by imaging sensor 15. Flash module 14 maybe adapted for projecting and/or filtering light polarization. Flash module 14 may further be adapted for diffusing light (e.g. holographic diffuser, optical lenses etc.) and projecting one or more Field Of illumination (FOI). Flash module 14 FOI may be controlled (i e make in narrow or wide) during system 10 operation. Flash module 14 further includes a pulsed light source (e.g. LED, LASER, flash lamp, etc.) to provide pulsed illumination. Flash module 14 may include a light source wavelength controller based on an electrical method (e.g. thermo electric cooler), and/or suitable mechanical method and/or any optical method and device for stabilizing illumination wavelengths, as appreciated by those having ordinary skill in the art.

Flash module 14 is controlled by flash control 13 via a dedicated channel 20. Flash control 13 is adapted to receive trigger signal from system control 11 and per each trigger to drive a pulsed event to flash module 14. Flash control 13 may further manage flash module 14 illumination parameters such as: FOI, wavelength, pulse characteristics (e.g. raise/fall time, duration and peak power).

Imaging sensor 15 and imaging optical module 16 are controlled by imaging control 12 via a dedicated channel 19. Imaging control 12 is adapted to receive trigger signal from system control 11 and per each trigger to expose imaging sensor 15. Imaging control 12 may further manage sensor parameters (Imaging sensor 15 and imaging optical module 16): focus, shutter, exposure duration, gain, sensor Region-of-Interest (ROI) and sensor readout mechanism.

Imaging control 12 and flash control 13 are controlled by system control 11 via dedicated channels 17 and 18 respectively. System control 11 is adapted to trigger imaging control 12 and flash control 13 to provide selective and controllable scene volume imaging. Above low light level conditions, flash control 13 may not activate flash module 14 and imaging control 12 may have a different operating mode for example an CIS (imaging sensor 15) may be operate in gated mode during low light level whereas the sensor may operate in other lighting conditions with a "4T" mode (i.e. a photodetector, a floating diffusion, a transfer gate, reset gate, selection gate and source-follower readout transistor) or any other pixel transistor design/mode. Signal 21 controls system 10 in the portable device it is hosted.

$R_{max}$ range may also be selected based on at least one of the following system 10 parameters; maximal imaging sensor 15 resolution, maximal flash module 14 peak power that and photography (imaging) boundary conditions (e.g. image is taken outdoors, indoors, static, on the move, etc.). For example, if the image is taken in a dark room where $R_{max}$=10 m, than $T_{ON}$ should not be more than 0.33 μs (i.e. may be shorter). In addition, photography (imaging) boundary conditions may also effect minimal range $R_{min}$.

Figure 2:
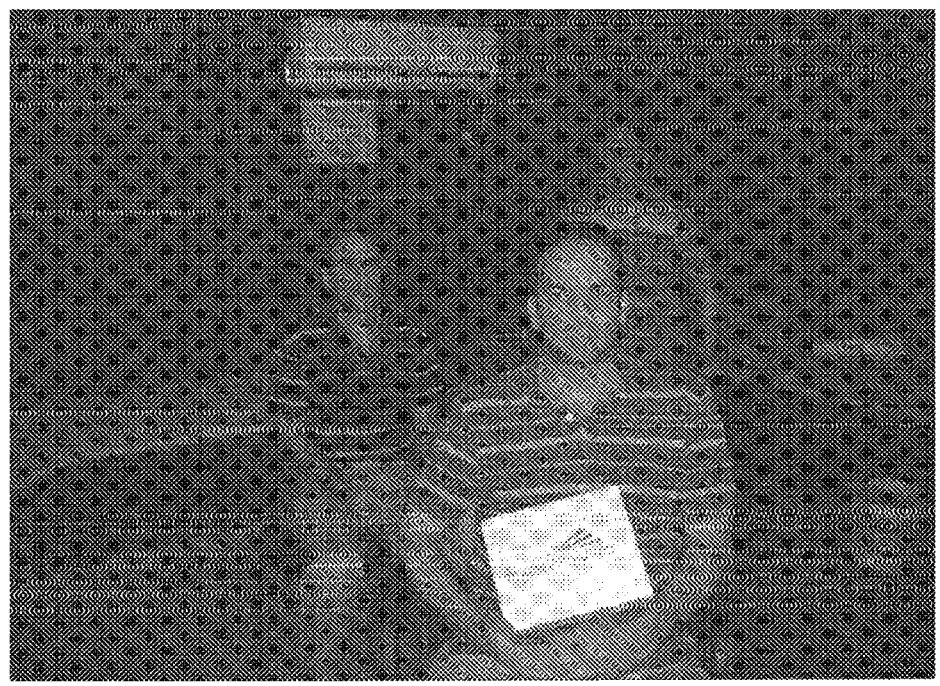
FIG. 2 is a picture taken with a typical portable camera using its flash light in accordance with some embodiments of the present invention.

FIG. 2 is a picture taken with a typical portable camera using its flash light. This picture illustrates the problem of the signal accumulation in the camera which was reflected from the camera flash light. Three targets (people in this case) are located in three different distances as to the camera in low light level environment conditions (i.e. dark room). The accumulated signal from the closest target as to the camera is almost saturated versus the faint signal accumulated from targets in the back. This effect is due to at least two reasons: the Inverse-square law and the camera Automatic Gain Control (AGC) mechanism. In addition, current camera devices do not provide a possibility to select a specific accumulated scene volume is desired (i.e. to focus on the third target which is located in the longest distance as to the camera).

Figure 3A:
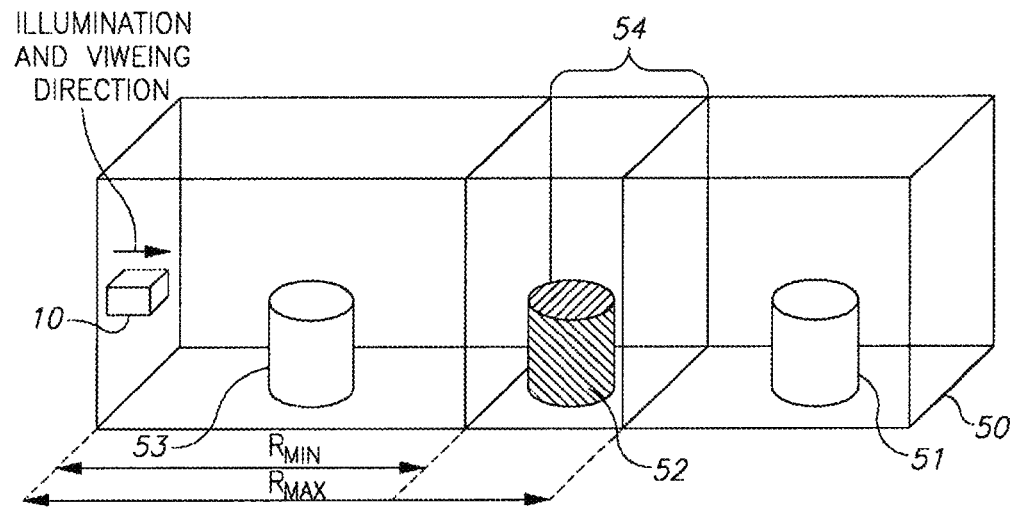
FIG. 3A-FIG. 3C illustrate different selective and controllable scene volume in accordance with some embodiments of the present invention.
Figure 3B:
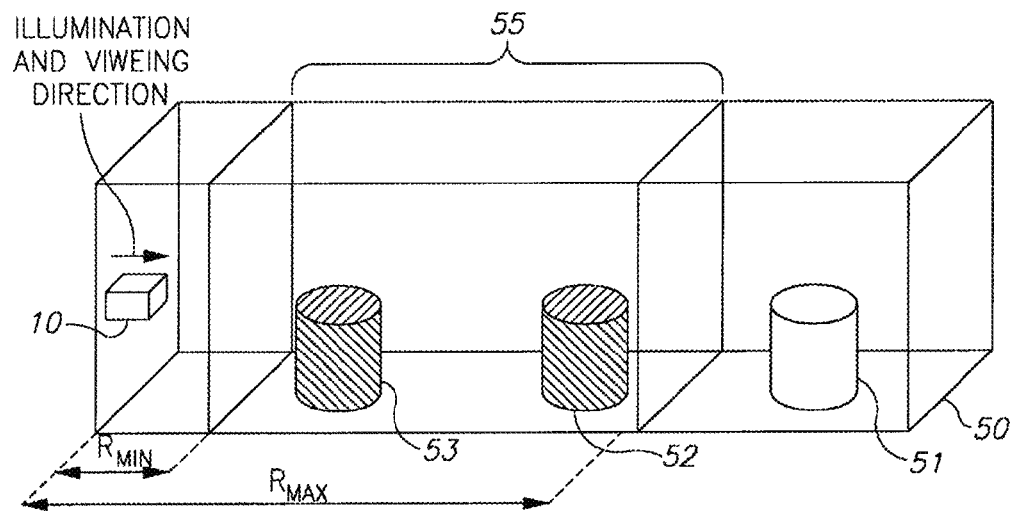
Figure 3C:
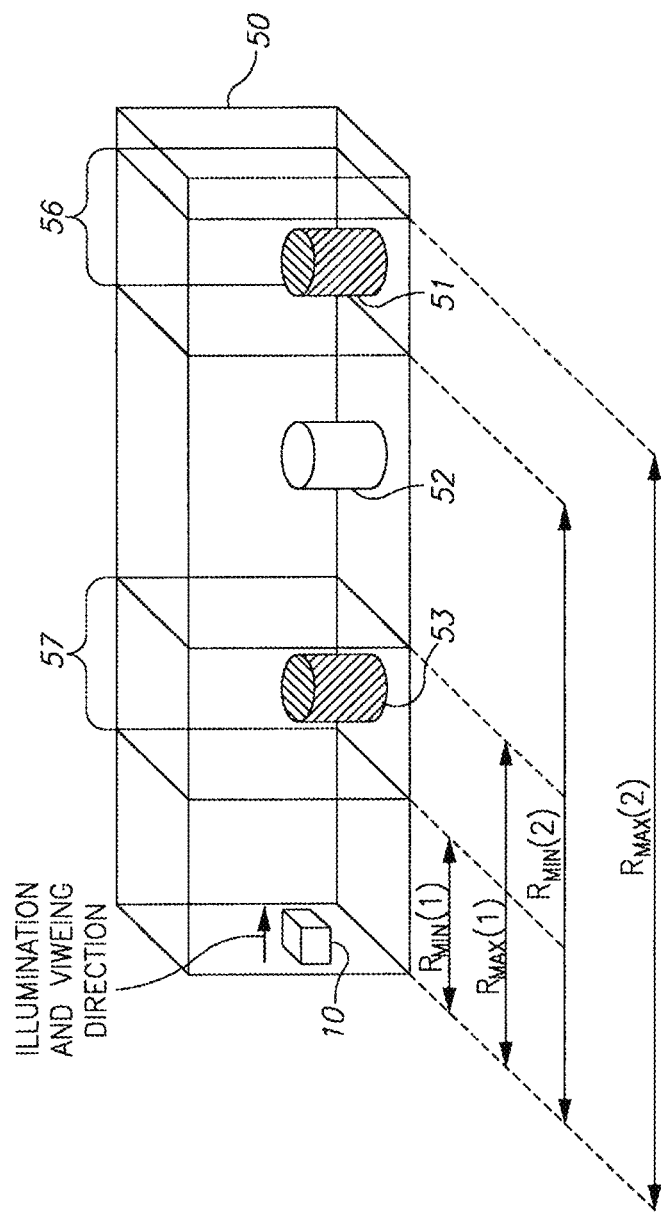

FIG. 3A-FIG. 3C illustrate one of the benefits of using the described method as to prior art. System 10 illuminates and accumulates the reflected illuminated flash light in different scene volumes (i.e. different minimal range $R_{min}$ and different maximal range $R_{max}$) in a specific scene 50. Three targets (51, 52 and 53) are located in the scene at different ranges as to system 10. FIG. 3A illustrates a selective accumulated scene volume represented by 54 with target 52. In this illustration the rest of the targets (51 and 53) may not have the minimal signal level to be noticed. FIG. 3B illustrates a selective accumulated scene volume represented by 55 with targets 52 and 53. In this illustration third target (51) may not have the minimal signal level to be noticed. FIG. 3C illustrates two selective accumulated scene volumes represented by scene volume 56 with target 51 having $R_{min}(2)$ and $R_{max}(2)$, whereas scene volume 57 with target 53 having $R_{min}(1)$ and $R_{max}(1)$. In this illustration, third target (52) may not have the minimal signal level to be noticed (e.g. is darker as to other targets in the scene). In addition, a single image frame (i.e. still image or a video frame) may have several selective and controllable scene volumes (e.g. two or more scene volumes with different $R_{min}$ and different $R_{max}$ or scene volumes with similar $R_{min}$ and different $R_{max}$ etc.).

Specific scene volume distance (e.g. $R_{min}$ and/or $R_{max}$) estimation can be calculated based on geometrical dimensions of viewed object (e.g. an object of length of 1 m at a distance of 2 m will be larger than an object of the same length at a distance of 4 m). Another method of estimation volume distance (e.g. $R_{min}$ and/or $R_{max}$) may be performed by means of direct distance measurement (such as time of flight principle). Another method of estimation volume distance (e.g. $R_{min}$ and/or $R_{max}$) may be performed by changing the $R_{min}$ from a certain minimal value up to a desired value in each frame which corresponds with an adequate SNR for the selected $R_{min}$.

Figure 3D:
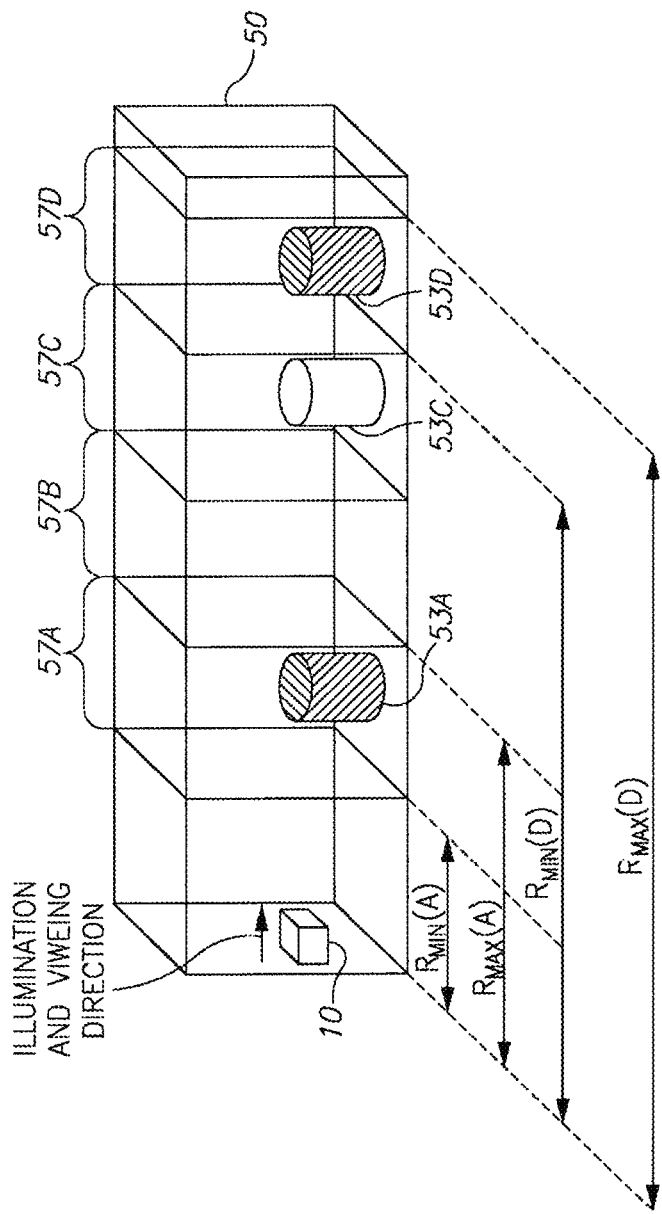

FIG. 3D illustrates one of the benefits of using the described method as to prior art. System 10 illuminates and accumulates the reflected illuminated flash light in different scene volumes (i.e. different minimal range $R_{min}(A)$, $R_{min}(D)$ and different maximal range $R_{max}(A)$, $R_{max}(D)$ respectively) in a specific scene 50. Scene 50 is divided to multiple scene volumes (57A, 57B, 57C and 57D). Three objects (53A, 53C and 53D) are located in the scene at different ranges as to system 10. Selective accumulated scene volumes are represented by 57A with object 53A, 57C with object 53C and 57D with object 53D. Each one of the scene volumes (57A, 57B, 57C and 57D) may have different system setup conditions for example: camera pulse flash duration ($T_{LASER}$), camera pulse flash intensity, camera pulse flash raise/fall time, delay time between camera pulse flash to camera exposure ($T_{OFF}$), camera exposure duration ($T_{ON}$), camera exposure raise/fall time and the number of camera pulse flashes/number of camera exposures. The captured scene volumes (57A, 57B, 57C and 57D) maybe overlapping as to each other, partly overlapping as to each other or not overlapping at all as to each other. The captured scene volumes (57A, 57B, 57C and 57D) may further be processed by means of: fusion of one or more scene volumes captured images, selecting one or more scene volumes images to display or any other super-position image processing of the captured scene volumes. This method provides an enhanced image to the user. The output of the image processing in FIG. 3D is an enhanced image where objects 53A and 53D are optimized (i.e. have the best signal, SNR, focus), whereas object 53C may have low signal levels (i.e. darker than 53A and 53D).

Figure 3E:
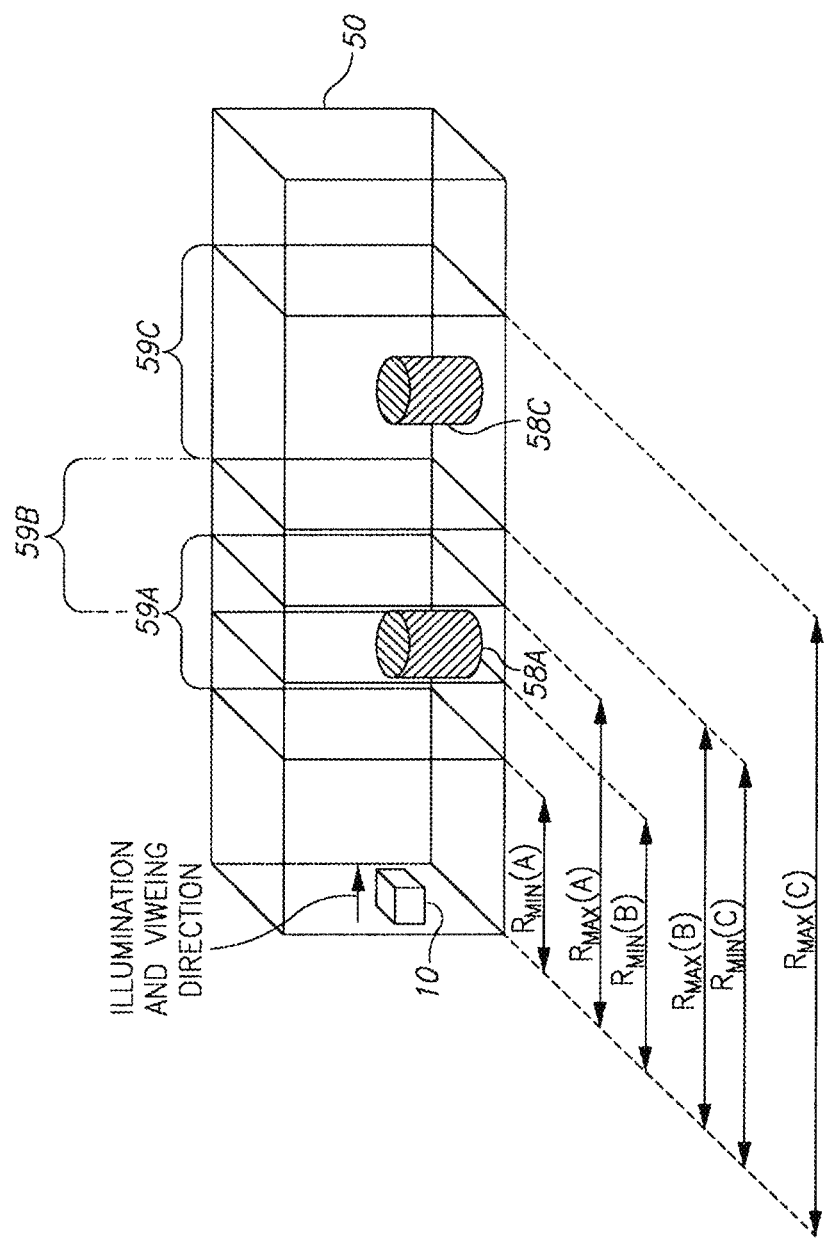

FIG. 3E illustrates one of the benefits of using the described method as to prior art. System 10 illuminates and accumulates the reflected illuminated flash light in different scene volumes (i.e. different minimal range $R_{min}(A)$, $R_{min}(B)$, $R_{min}(C)$ and different maximal range $R_{max}(A)$, $R_{max}(B)$, $R_{max}(C)$ respectively) in a specific scene 50. Scene 50 is divided to multiple scene volumes (59A, 59B and 59C). Two objects (58A and 58C) are located in the scene at different ranges as to system 10. Selective accumulated scene volumes are represented by 59A with object 58A, 59B with the same object 58A and 59C with object 58C. Each one of the scene volumes (59A, 59B and 59C) may have different system setup conditions for example: camera pulse flash duration ($T_{LASER}$), camera pulse flash intensity, camera pulse flash raise/fall time, delay time between camera pulse flash to camera exposure ($T_{OFF}$), camera exposure duration ($T_{ON}$), camera exposure raise/fall time and the number of camera pulse flashes/number of camera exposures. In this illustration $R_{max}(B)=R_{min}(C)$. The captured scene volumes (59A, 59B and 59C) maybe overlapping as to each other, partly overlapping as to each other or not overlapping at all as to each other. The captured scene volumes (59A, 59B and 59C) may further be processed by means of: fusion of one or more scene volumes captured images, selecting one or more scene volumes images to display or any other super-position image processing of the captured scene volumes. This method provides an enhanced image to the user. The output of the image processing in FIG. 3E is an enhanced image where objects 58A and 58C are optimized (i.e. have the best signal, SNR, focus), whereas the rest of the scene 50 may have low signal levels.

In another embodiment, different scene volumes captured by device 10 may be referred by different capturing modes. For example, the nearest captured volume scene can be referred as Sport Mode (e.g. a short frame image duration of the range of 500 μs with specific exposure timing sequence), the further away captured volume scene can be referred as Night Mode (e.g. a long frame image duration of the range of a few ms with specific exposure timing sequence) and the third captured volume scene can be referred as Regular Mode (e.g. a typical frame image duration of the range of 1 ms with specific exposure timing sequence). All these capturing Modes can be controlled by the user or alternatively selected by the capturing device 10. This method provides an additional layer of flexibility of capturing an enhance image.

Figure 4:
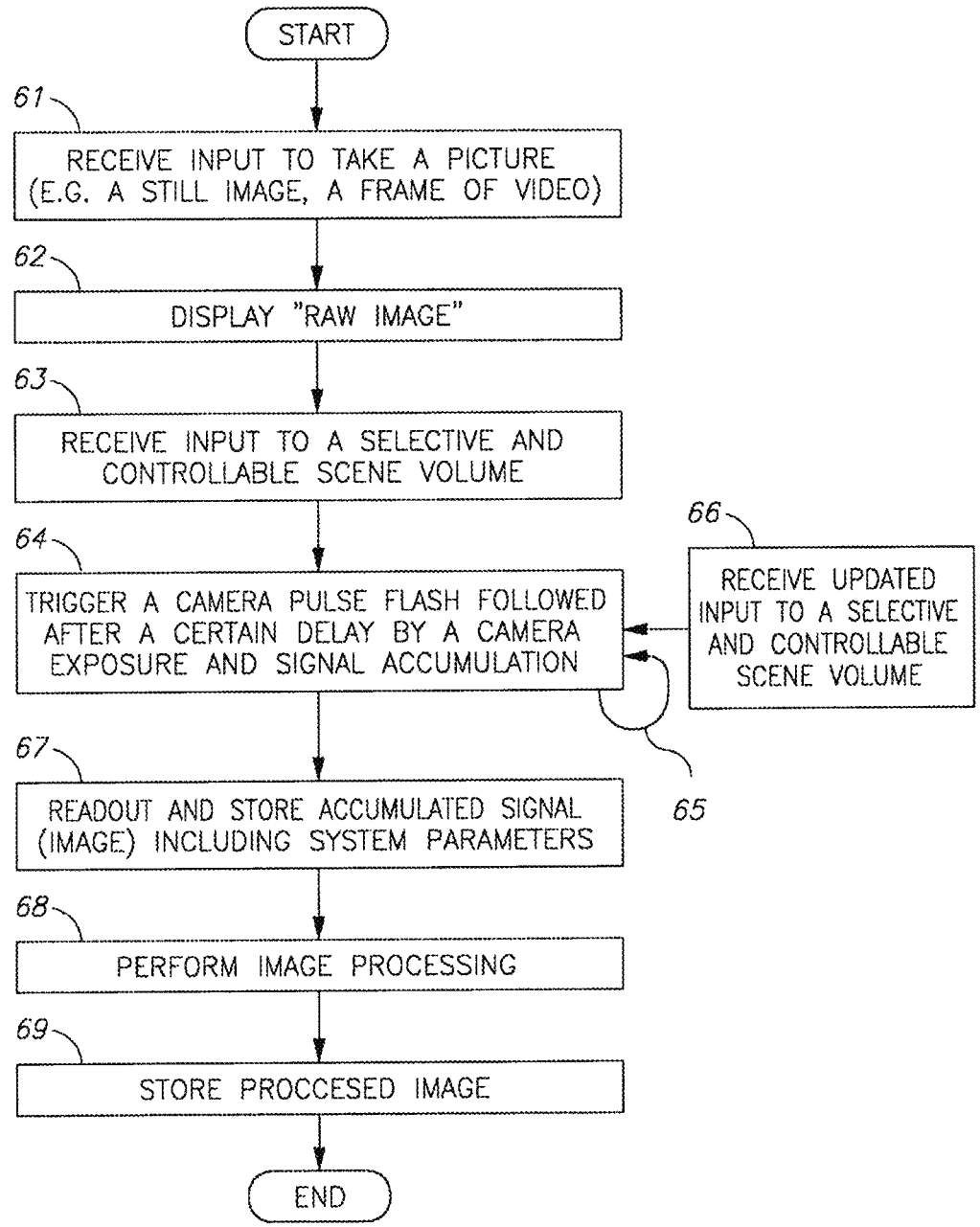
FIG. 4 is a flow diagram of operations performed by the smart camera device to yield improved picture quality in accordance with some embodiments of the present invention.

FIG. 4 is a flow diagram of operations performed by the smart camera device to yield improved picture quality in accordance with some embodiments of the present invention. The operations of the method may be performed by the device 10, and in particular by the system controller 11 described above. After system (or device) 10 has been turned on, and the smart camera function is ready to take pictures, input (block 61) is received to take a picture. The picture may be a single still image frame, or it may be a single image video frame.

At this point, camera function may detect scene conditions such as ambient lighting, target conditions (e.g. static or moving), based on which it may then determine the required exposure time, lens position (zoom and focus) and determine if flash is required. Flash usage may be decided by the user or automatically determinate based on scene lighting conditions.

Once the viewed scene requires a flash light to enhance image quality, block 62 then provides (displays) a basic raw image (still image or a video feed) of the viewed scene. Basic raw image may be illuminated or not illuminated by flash module 14.

In this stage input (block 63) is received to select a specific scene volume (a specific depth-of-field). Specific scene volume may be chosen by indicating at least one point on the captured image. For example, the volume selection may be carried out automatically based on data recognition of one or more objects within the scene.

The camera function then sets the appropriate camera flash and camera exposure timing sequence (i.e. the required $T_{LASER}$, $T_{ON}$ and $T_{OFF}$ to provide the selected specific scene volume) in block 64. This internal automatic input (block 65) repeats the camera flash and camera exposure timing sequence followed by the accumulated signal camera readout. This multiple flash/camera exposure sequences provide the desired signal level versus the camera noise. Each timing sequence may have different system setup conditions for example: camera pulse flash duration ($T_{LASER}$), camera pulse flash intensity, camera pulse flash raise/fall time, delay time between camera pulse flash to camera exposure ($T_{OFF}$), camera exposure duration ($T_{ON}$), camera exposure raise/fall time etc. As the selected specific scene volume is created (based on block 63 inputs) an additional input (block 66) may update a new specific scene volume which may set a new/updated timing sequence and different system setup condition as described above.

In this stage an internal automatic input (block 67) is received to readout and store the accumulated signal (image) including system 10 parameters such as: system setup conditions (as described above), camera zoom, camera exposure time, flash module FOI, system 10 time-tag, location (may be based on GPS data), etc.

Image processing may then be performed upon the stored picture file, using the stored system parameters (block 68). This process may include prior art such as: artifacts removal, deblur operation, motion compensation etc. In addition, scene range data can be extracted from the timing sequence ($T_{LASER}$, $T_{ON}$ and $T_{OFF}$) to be added to the picture. Finally, the processed picture is stored (block 69) to be displayed latter or extracted from the memory for other use.

Indicating at least one point on the captured image comprises at least one of: a tactile event, a visual event, a sound event and a predefined setting. Specifically, the indicating can be carried out automatically and without input from the user, based on the predefined settings or criteria.

Predefined setting conditions or criteria may include configurations that can be set in advance for at least one of the parameters of system 10 such as: illumination and exposure timing sequence ($T_{LASER}$, $T_{ON}$, $T_{OFF}$), number of flash illumination/sensor exposures and even region of interest of flash illumination and sensor signal accumulation. Predefined setting selection may be based on pattern recognition in the imaged scenery. In such a configuration, an image is processed (block 62) to recognize a specific pattern (for example a face of a family member). The output of this recognition may be to provide the best Signal to Noise Ratio (SNR) of the specific pattern (in this example, the face of a family member) out of the viewed scenery. Another output of this pattern recognition may be to exclude this specific pattern (in this example, the face of a family member) out of the viewed scenery, hence to provide a lower SNR versus the background to this object.

Predefined setting selection may also be based on signal identification in the imaged scenery. In such a configuration, signal recognition may be based on specific platform ID (e.g. for mobile phone the ID is the mobile phone number). The output of this identification may be to provide the best SNR of the specific platform (in this example, the person with the mobile phone) out of the viewed scenery. Another output of this identification may be to exclude this specific platform (in this example, person with the mobile phone) out of the viewed scenery, hence to provide a lower SNR versus the background to this object.

In another embodiment, predefined setting selection may be based also on photography (imaging) boundary conditions (defined hereinafter).

Figure 5:
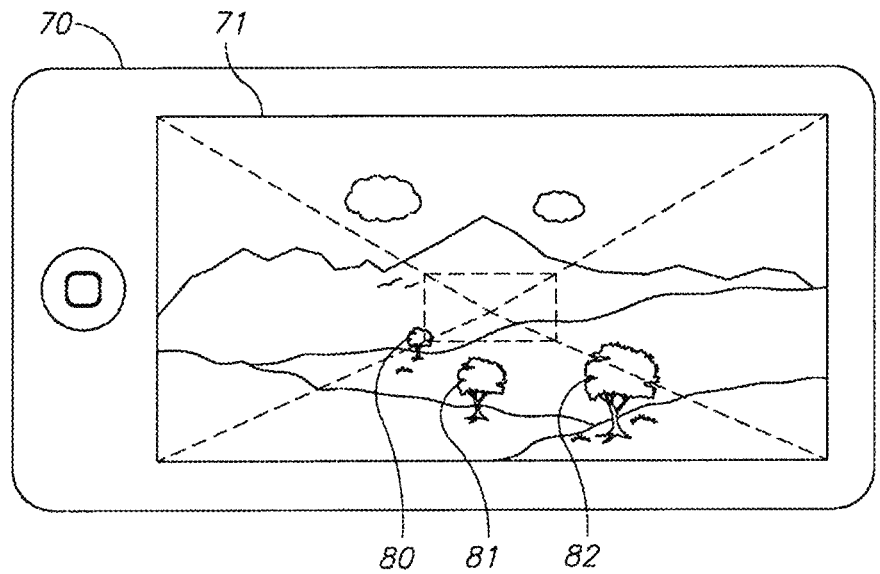
FIG. 5 is an illustration of a forward-looking view of an apparatus, constructed and operative in accordance with some embodiments of the present invention.

FIG. 5 is an illustration of a forward-looking view of apparatus 70 having a display 71 displaying three targets (80, 81 and 82) located at different ranges, as to apparatus 70, within the viewed scenery. System 10 maybe part of, or integrated within or connected to apparatus 70 to provide image enhancement as described aforementioned.

Figure 6:
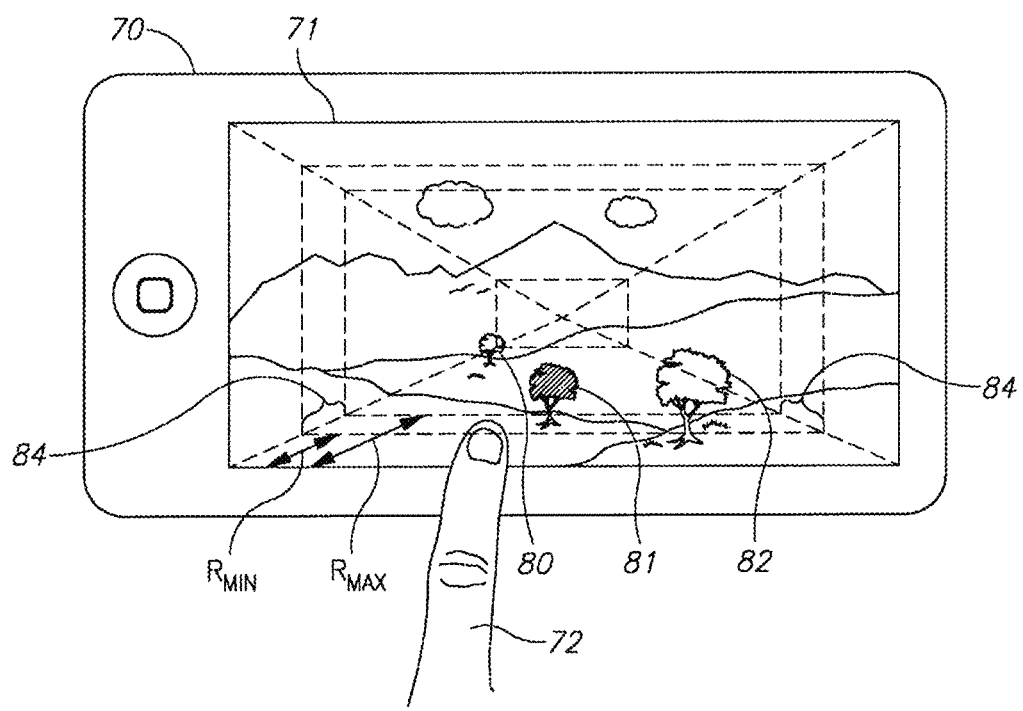
FIG. 6-FIG. 8 are illustrations of a forward-looking view of an apparatus, constructed and operative to yield a selective and controllable scene volume in accordance with some embodiments of the present invention.

FIG. 6 is an illustration of a forward-looking view of apparatus 70 utilizing system 10 to capture an enhance image on target 81 within the viewed scene. A selective and controllable scene volume (84 defined by $R_{min}$ and $R_{max}$) containing target 81 is provided as described in flow chart in FIG. 4. Input 63 and input 66 (FIG. 4) are provided in FIG. 6 by tactile indicating in at least one point on the captured image. Display 71 may be a touchscreen where a single stylus or a single finger 72 is used per touch. Tactile method, $R_{min}$ and $R_{max}$ may be defined, for example, by at least one of the following options (Option A to Option C) hereinafter.

Option A may consist of the following steps; touching 72 target 81 on the display 71 until $R_{min}$ is selected (i.e. system 10 sweeps $T_{OFF}$ until finger 72 is raised), touching 72 again target 81 on the display 71 until $R_{max}$ is selected (i.e. system 10 sweeps $T_{ON}$ and $T_{LASER}$ until finger 72 is raised) and raising finger 72 to take a gated picture.

Option B may consist of the following steps; touching 72 the display 71 until $R_{min}$ is selected (i.e. system 10 sweeps $T_{OFF}$ until finger 72 is raised), touching 72 again the display 71 until $R_{max}$ is selected (i.e. system 10 sweeps $T_{ON}$ and $T_{LASER}$ until finger 72 is raised) and raising finger 72 to take a gated picture.

Option C may consist of the following steps; touching 72 target 81 on the display 71, $R_{min}$ is selected (i.e. system 10 sweeps $T_{OFF}$ until target 81 is noticeable with a good signal), $R_{max}$ is selected (i.e. system 10 sweeps $T_{ON}$ and $T_{LASER}$ until target 81 is noticeable with a good signal) a gated picture is taken.

Figure 7:
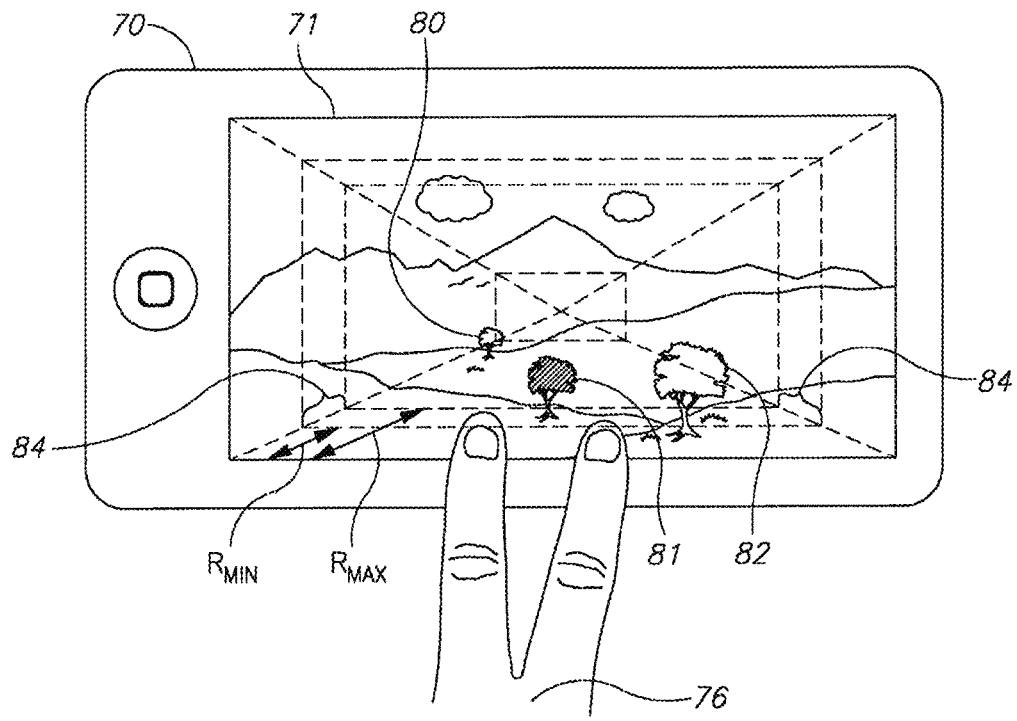

FIG. 7 is an illustration of a forward-looking view of apparatus 70 utilizing system 10 to capture an enhance image on target 81 within the viewed scene. A selective and controllable scene volume (84 defined by $R_{min}$ and $R_{max}$) containing target 81 is provided as described in flow chart in FIG. 4. Input 63 and input 66 (FIG. 4) are provided in FIG. 7 by tactile indicating in at least one point on the captured image. Display 71 may be a touchscreen where two points of interest are made by two fingers 76 per touch. Tactile method, $R_{min}$ and $R_{max}$ may be defined, for example, by at least one of the following options (Option D) hereinafter.

Option D may consist of the following steps; touching 76 target 81 on the display 71 until $R_{min}$ and $R_{max}$ is selected (i.e. system 10 sweeps $T_{ON}$ and $T_{LASER}$ until fingers 76 are raised). Gated picture is taken once fingers 76 are raised.

In another embodiment, indicating one point on the captured image (input 63 and input 66 in FIG. 4) may be provided by a sound method. For example, a voice command can indicate $R_{min}$ or $R_{max}$ or a specific object in the captured image.

Figure 8:
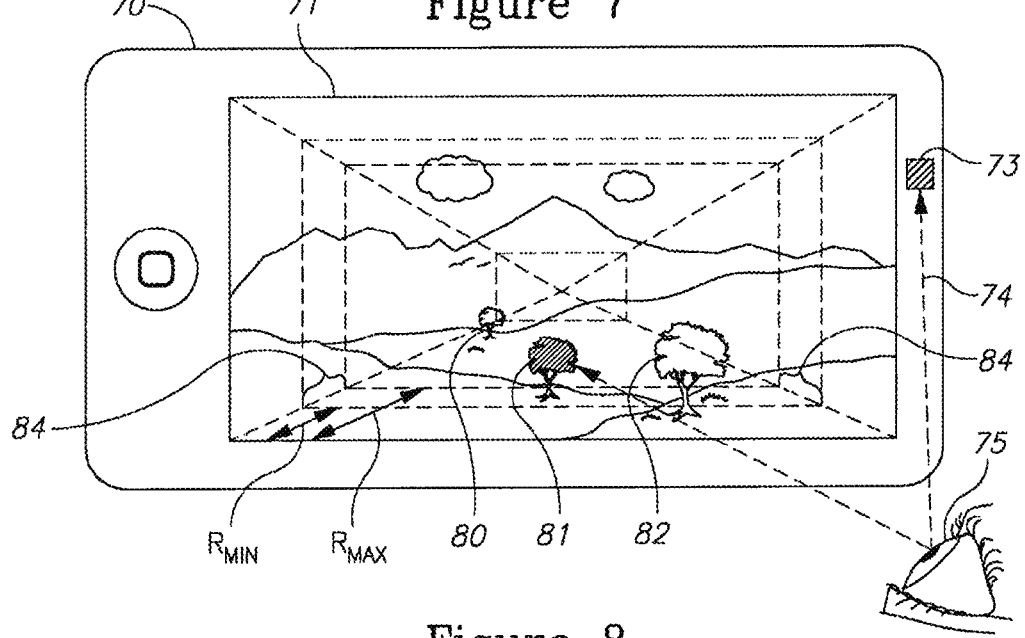

FIG. 8 is an illustration of a forward-looking view of apparatus 70 utilizing system 10 to capture an enhance image on target 81 within the viewed scene. A selective and controllable scene volume (84 defined by $R_{min}$ and $R_{max}$) containing target 81 is provided as described in flow chart in FIG. 4. Input 63 and input 66 (FIG. 4) are provided in FIG. 8 by visual indicating in at least one point on the captured image. Eye tracking module 73 may be located in apparatus 70 to provide eye 75 position 74 and movement data for setting at least one of the following: $R_{min}$, $R_{max}$ and desired object in the displayed image.

Figure 9:
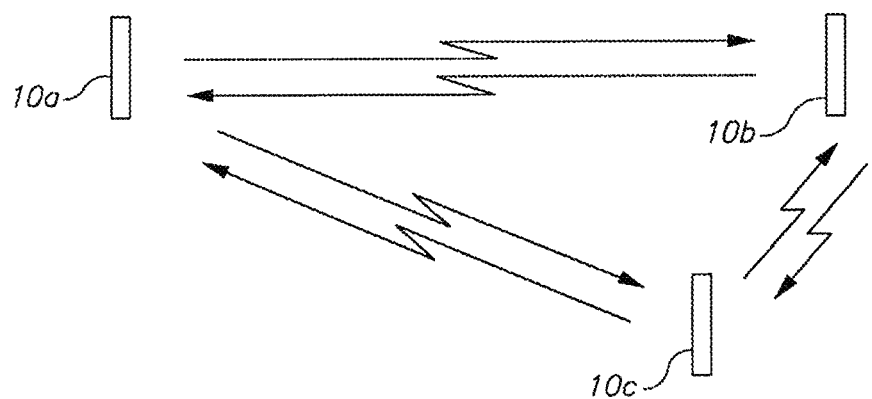
FIG. 9 is a schematic illustration of the operation of systems, constructed and operative in accordance with some embodiments of the present invention.

FIG. 9 is an illustration of a situation with multiple devices (10a, 10b and 10c) such as system 10 described hereinabove. These systems may communicate between each other to transfer photography (imaging) boundary conditions. For example, distances between systems (e.g. device 10a with device 10b and device 10c) may be transferred. These inputs may be used to set some of the illumination and exposure timing sequence of one of the devices (10a, 10b and 10c) where an image is taken.

In another embodiment, a situation (i.e. multiple devices) such as described in FIG. 9 a specific device may use another device to illuminate a flash and/or even take the image. This method utilizes the spread of devices (10a, 10b and 10c) in a certain volume to optimize and maximize the captured image.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An imaging method for a mobile device comprising:
   communicating between multiple devices to transfer at least boundary conditions determining scene conditions and determining whether flash is required;
   capturing a raw image of a scene using a capturing device, wherein a capturing device operates in a gated mode having a timing sequence;
   wherein a scene comprises background and objects viewed by the capturing device;
   indicating two or more locations on the captured raw image, wherein each location on the captured raw image corresponds with a location in the scene;
   calculating respective volume portions within the scene based on the indicated two or more locations on the captured raw image for two or more locations on the captured raw image, wherein the volume portions are at different distances from the capturing device and spaced from each other;
   determining a flash pulse having specified parameters and said capturing device exposure timing sequence directed at the scene based at least on said boundary conditions;
   for each and every calculated volume portion independently performing said determining, flash pulse and exposure timing sequence in which an exposure of the capturing device is synchronized with reflections of the flash pulse from the calculated volume portion reaching the capturing device;

after said flash pulse and exposure sequences accumulating the reflections of at least two scene volume portions within a single image frame to yield an enhanced image for said mobile device.

2. The method according to claim 1, wherein the indicating is carried out automatically, based on predefined criteria.

3. The method according to claim 1, wherein the indicating is carried out, based on user selection.

4. The method according to claim 3, wherein the user selection comprises at least one of: a tactile event, a visual event, and a sound event.

5. The method according to claim 4, wherein the sound event is carried out by user voice input.

6. The method according to claim 3, wherein the selection is carried out manually responsive to user input.

7. The method according to claim 3, wherein the selection is carried out by at least one of: selection of a 3D box, selection of a specified range, selecting one or more objects to ignore so that the selected volume portion does not include the ignored objects.

8. The method according to claim 3, wherein the user selection is carried out by indicating one or more objects over a touchscreen.

9. The method according to claim 1, further comprising repeating the generating and the synchronizing with one or more flash pulses and respective synchronized exposures.

10. The method according to claim 1, wherein each said volume portion is defined by a minimal range $R_{min}$ being a minimal distance between the capturing device and the volume portion and a maximal range $R_{max}$ being a maximal distance between the capturing device and the volume portion, and wherein the volume calculation is carried out by indicating $R_{min}$ and $R_{max}$ over said captured raw image.

11. The method according to claim 1, wherein the flash pulse is within a range of visible light.

12. The method according to claim 1, wherein the flash pulse is within a range of non-visible light.

13. The method according to claim 1, wherein the flash pulse parameters include: intensity, frequency, and duration, and wherein the pulse parameters are adjusted based on the calculated volume portion parameters.

14. The method according to claim 1, wherein the volume portion calculation is carried out automatically, based on data recognition of one or more objects within the scene.

15. The method according to claim 1, wherein the volume portion calculation is carried out manually responsive to user input.

16. The method according to claim 1 wherein the boundary conditions include one or both of ambient light level and whether or not the apparatus is moving.

17. A mobile device comprising a system comprising:
a capturing device configured to operate in a gated mode according to a timing sequence to capture a raw image of a scene wherein a scene comprises background and objects viewed by the capturing device;
an indicator configured to indicate two or more locations on the captured raw image, wherein each location on the captured image corresponds with a position in the scene;
a computer processor configured to:
receive at least boundary conditions from another device and determine whether flash is required;
calculate respective volume portions within the scene based on the two or more locations on the captured raw image for two or more locations on the captured raw image, wherein the volume portions are at different distances from the capturing device and spaced from each other; and
for each volume portion determine a flash pulse having specified parameters and said capturing device timing sequence based at least on said boundary conditions; and
a light source configured to generate said flash pulse having said specified parameters and timing sequence directed at the scene,
wherein the computer processor is further configured to, for each and every calculated volume portion independently, synchronize an exposure of the capturing device to be carried out when reflections of the flash pulse from the calculated volume portion reaches the capturing device,
wherein, after said flash pulse and exposure sequences, reflections of at least two scene volumes within a single frame are accumulated, to yield an enhanced image for said mobile device.

18. The system according to claim 17, wherein said volume portion is defined by a minimal range $R_{min}$ being a minimal distance between the capturing device and the volume portion and a maximal range $R_{max}$ being a maximal distance between the capturing device and the volume portion and wherein the volume calculation is carried out by indicating $R_{min}$ and $R_{max}$ over said captured image.

19. The system according to claim 17, wherein the flash pulse is within visible light.

20. The system according to claim 17 wherein the boundary conditions include one or both of ambient light level and whether or not the apparatus is moving.

* * * * *